Aug. 31, 1965 G. J. DOUNDOULAKIS 3,204,026

NARROW BANDWIDTH SCANNING SYSTEM

Filed April 30, 1962 7 Sheets-Sheet 1

INVENTOR.
George J. Doundoulakis
BY Constantine A. Michalos
ATTORNEY

Aug. 31, 1965 G. J. DOUNDOULAKIS 3,204,026

NARROW BANDWIDTH SCANNING SYSTEM

Filed April 30, 1962 7 Sheets-Sheet 2

INVENTOR.
George J. Doundoulakis
BY Constantine A. Michalos
ATTORNEY

INVENTOR.
George J. Doundoulakis
BY
Constantine A. Michalos
ATTORNEY

NARROW BANDWIDTH SCANNING SYSTEM

Filed April 30, 1962 7 Sheets-Sheet 4

INVENTOR.
George J. Doundoulakis
BY
Constantine A. Michalos
ATTORNEY

INVENTOR.
BY George J. Doundoulakis
Constantine A. Michalos
ATTORNEY

Aug. 31, 1965 G. J. DOUNDOULAKIS 3,204,026

NARROW BANDWIDTH SCANNING SYSTEM

Filed April 30, 1962 7 Sheets-Sheet 6

INVENTOR.
George J. Doundoulakis
BY
Constantine A. Michalos
ATTORNEY

INVENTOR.
BY George J. Doundoulakis
Constantine A. Michalos
ATTORNEY

United States Patent Office 3,204,026
Patented Aug. 31, 1965

3,204,026
NARROW BANDWIDTH SCANNING SYSTEM
George J. Doundoulakis, North Bellmore, N.Y., assignor to William J. Casey, Long Island, N.Y.
Filed Apr. 30, 1962, Ser. No. 190,973
16 Claims. (Cl. 178—6.8)

This invention relates to a scanning system capable of reducing the frequency bandwidth required for the transmission of electrical signals.

The required bandwidth in television and other scanning systems results from the rate of variation of the intensity along horizontal strips of the scanned configuration. In television systems, the faster the rate of change of the picture intensity, the greater the required bandwidth; thus the required frequency bandwidth is determined by the rate of variation of intensity and, therefore, the rate of variation of the video signal necessary to change the intensity of the picture from extreme white to the extreme black, or vice-versa, within a fixed short length interval along the horizontal line of the picture. Scanning is also employed in a multitude of other instances, as for example in computers, in facsimile, and in stencil-cutting for mimeograph machines. For every such device a frequency bandwidth is assigned. The frequency bandwidth, in every case, may be visualized as the speed of response required of the particular device to reproduce the sharpest variations of signal intensity within the time allowed. Devices employing scanning could utilize narrower frequency bandwidths if the rate of scanning were slowed down. This, however, would result in direct deterioration of the performance of the particular system. For example, in the case of television, if the number of frames were reduced, a flicker of the picture would result which would make it uncomfortable to the viewer. Slowing down the scanning rate of a facsimile system would correspond directly to a loss of time and, therefore, would result in proportionate inefficiency of the system.

The present invention accomplishes a reduction in the required frequency bandwidth with little or no deterioration in quality or loss of efficiency of the apparatus. In fact, the invention can provide, in some instances, narrower bandwidth requirements simultaneously with improved performance. Reduction of the required frequency bandwidths for applications such as mentioned above will not only improve the efficiency of presently available devices using scanning techniques, but will also enable the feasibility and generation of new devices. Such new devices cannot function today because conventional methods and systems demand frequency bandwidths which cannot presently be accommodated by such devices. For example, slow response devices such as the phonograph type and other mechanical systems, audio tape recorders, narrow frequency bandwidth transmission lines such as telephone lines, cannot process television video signals at present.

It is therefore, an object of the present invention to code visual information contained on a visual display in a relatively narrow bandwidth signal, so that this signal may be recorded on low frequency tape, transmitted by telephone circuits and narrow bandwidth wireless channels.

It is a further object of this invention to provide an apparatus capable of receiving the above mentioned coded narrow bandwidth signal, decoding it, and from it reproducing the original visual information.

It is a further object of this invention to provide a method for increasing efficiency by reducing the bandwidth now required by conventional devices employed in scanning, transmitting, recording and reproducing visual information, or any other data which may be presented in two dimensional matrix form, so that better performance is achieved with the presently employed bandwidth.

It is also an object of the invention to code television programs and other visual information in such a manner that conventional receiving devices are unable to translate and process the information, but receiving and processing apparatus in accordance with the invention will be able to reproduce the visual information for "Pay TV" applications, educational or military purposes, and other programs and transmissions intended for restricted groups of individuals.

It is still another object of this invention to provide a simplified and more efficient method and means for reading, processing, transmitting, recording, receiving and reproducing visual display information, or other information which is first transformed into such visual form.

Figures 1, 1A, 1B, 1C:
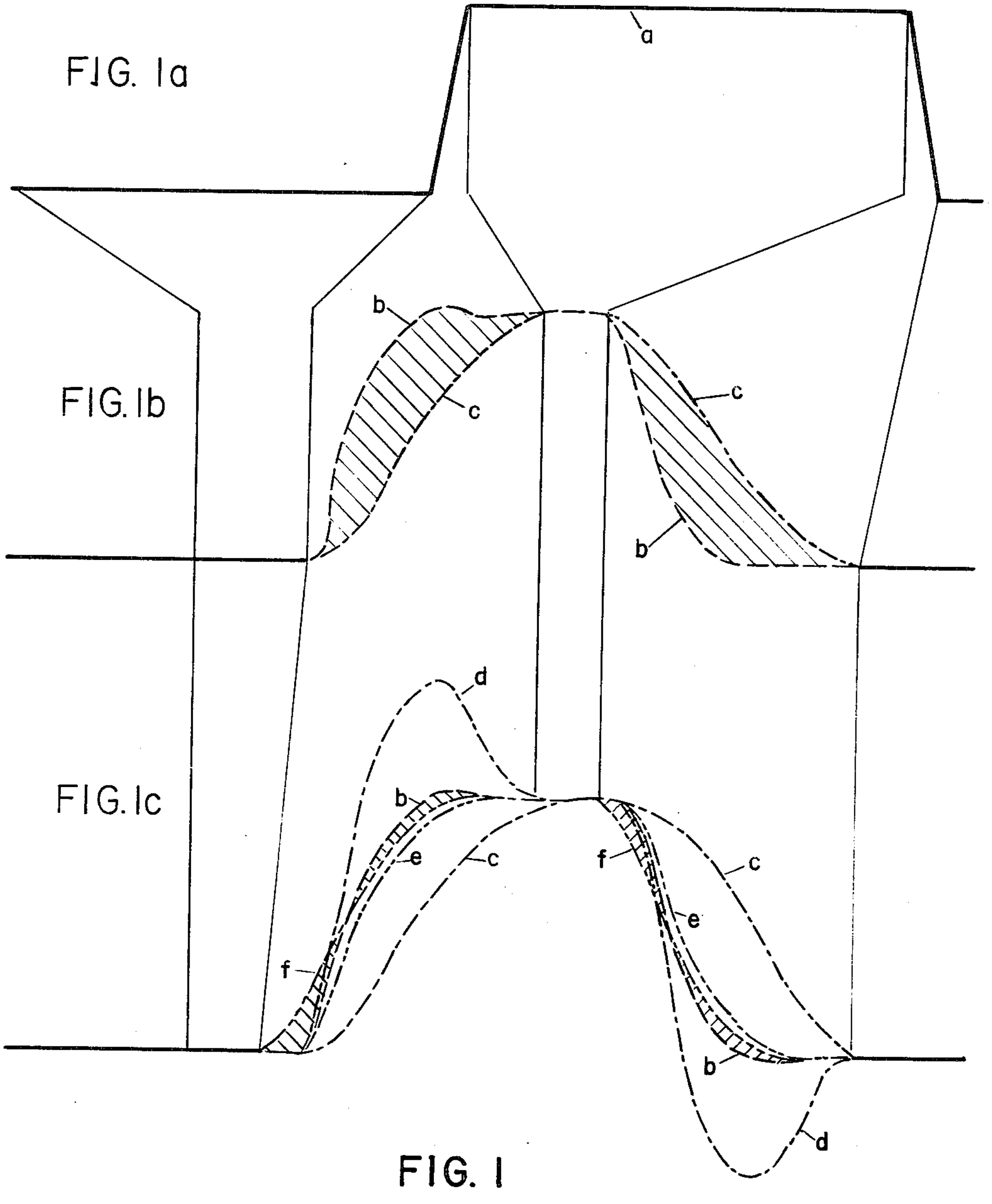
FIG. 1 shows a hypothetical pulse in the picture intensity and how it is changed in amplitude and phase at the different stages of the invention.

Conventional scanning techniques need wide frequency bandwidths to enable the picture to change from extreme black to extreme white within the interval of one cell. In television, the interval of one cell may be defined as the shortest horizontal distance which can be resolved by the human eye when the picture is viewed from a proper distance, and this is considered to be about 5 times the width of the screen. Since the vertical distance between two horizontal lines has also been set on the basis of the same criteria, the length of a cell also may be considered to be of the order of a distance between two horizontal lines. The required bandwidth in the conventional television system may be roughly calculated from the amount of time that it takes for the scanning beam to traverse one cell interval.

Since there are 15,750 horizontal lines scanned per second, assuming that each horizontal line may be divided into approximately 700 cells, the electronic beam scans over 10,000,000 cells per second. If the intensity were to change from black to white within every cell, the video signal alone would contain a frequency of over 5 megacycles for sinusoidal transitions. For sharp, square pulse transitions a much greater bandwidth is required. It has been found in practice that about 4 megacycles bandwidth is required for a reasonably good television picture reproduction. Bandwidths of 6 megacycles have been allocated for each television channel. Actually, a 4 megacycle bandwidth is a compromise and for faithful reproduction of a television picture wider bandwidths could be beneficially employed, especially in the case of full color transmissions, where the color information is included, greater bandwidths could improve the quality of the full color picture considerably.

In a scanning system where the lines are scanned at a uniform rate the complexity of the picture being processed has no effect on the required bandwidth. Thus two pictures, one consisting of black and white alternations within every cell interval and another picture which may provide for only a single such variation in the entire picture, require same bandwidth and now take in the conventional TV system the same time to be scanned. The present invention provides for methods and means to apportion the time spent by the electronic beam for every cell in accordance with the complexity of the picture intensity of each particular cell. Thus, where the picture is of uniform intensity, the scanning beam moves fast, whereas where the picture intensity varies fast, the scanning beam slows down in accordance with the rate of change, so that the sharper the picture intensity change, the slower the rate of scanning. Thus, while the picture may be scanned in the present invention at a much slower rate than the conventional uniform rate over the points where the intensity changes abruptly, the picture may be scanned much faster than the conventional rate over the intervals where the picture intensity is uniform, therefore gaining some or all of the time lost during the scanning of the sharp picture variations. It is the rate of scanning utilized at the points where the picture intensity changes abruptly that determines the required bandwidth. On the other hand, the higher the scanning speed assigned to the uniform picture intensity regions, the greater the number of frames scanned per second, and therefore the less likelihood of disturbing flicker.

Several attempts made in the past for the reduction of the television bandwidth have produced poor results. The methods employing uniform scanning are inefficient. Once the assumption of a uniform rate of scanning is made, together with the assumptions that the system must be capable of changing from extreme black to extreme white within one single cell interval, and that a certain minimum number of frames are mandatory to preclude flicker, a wide bandwidth follows as a consequence. One can imagine the specifications that one would have to impose in the design of the springs of an automobile if it was to be restricted to a uniform normal high speed and had to climb a step of say 6 inches to get into the driveway. By prescribing several speeds to the automobile, the stringent demands from its various components are reduced or eliminated. Methods employing variable rates of television scanning known as "Velocity Modulation Techniques" have also been attempted and investigated in the past. British Patent No. 483,935, entitled "Method of and Means for Electric Transmission of Pictures and for Television," April 28, 1938, by Josef Briza, discloses variable velocity scanning. This patent states that "the exploring and reconstituting velocity" is controlled "by the absolute value of the differential quotient of the time function of the photoelectric cell currents, whereby the time function itself, but not the derived function, is transmitted." "The exploring and reconstituting velocity is a function of the absolute value of the differential quotient of the photoelectric cell currents obtained by scanning the picture and plotted against a time coordinate. It is understood that this differential quotient is the ratio of the increase of the photoelectric cell currents during an infinitesimally small time ($di_t$) over this infinitesimally small time ($dt$), that is $di_t/dt$. This function may be, for instance, inversely linear, so that the scanning velocity decreases with an increasing absolute value of the above mentioned function from a value $C_{max}$ corresponding to constant brightness of the whole picture to $C_{min}$, corresponding to the maximum value of the above mentioned function: The synchronism of the transmitter and the receivers is accomplished either so that the reconstituting velocity is controlled by the received picture frequency currents in the same way as the exploring velocity by the amplified photocell currents, or it is accomplished by introducing an auxiliary frequency band."

Despite the detailed description of this system in said patent, it is carried away by the mathematics of an idealized system, disregarding the fact that the proposed narrower bandwidth system could not respond to the mathematics employed in the reasoning. The patent employs as the controlling quantity the ratio $di_t/dt$ where $di$ is the current increase during an "infinitesimally small time $dt$." This statement, strictly speaking, assumes that the system can resolve and detect the current $di_t$. Such a system would require infinite bandwidth. Imagine, for example, three consecutive $dt$ intervals and assume that the intensity in the first interval is zero and that at the third interval the intensity has some value "$a$." The system will have to generate current $i_t$ during time $dt$ and the derivative will be $$\frac{di_t}{dt}=\lim_{dt\to 0}\frac{a}{dt}$$

In practice, the resolution of the optical and electronic instruments is limited and, therefore, such infinite rates of change do not occur. Let it be supposed that the exploring beam is travelling over a uniform region when it encounters an abrupt change occurring within an elementary cell. In accordance with said patent system both the exploring and reconstituting beam velocities are required to change within the time interval that would be required for either beam to traverse one cell while travelling with a velocity corresponding to the previously scanned uniform region. If the electronic elements which control the velocity of the exploring beam do not have a sufficiently rapid response and, therefore, wide bandwidth, the slowing down of the exploring beam will take some time and probably will occur after the exploring beam has already passed the abrupt change, when these actions will be of no value. Assuming that the electronic circuitry which determines the velocity of the exploring beam processes a sufficiently wide bandwidth to slow down the exploring beam within the required time interval; then, since in Briza's system there is no provision for employing a reconstituting velocity different from the exploring velocity, the signal transmitted should have the same wide bandwidth as determined by the exploring velocity. Mathematically, in order that the reconstituting beam keep in synchronism with the exploring beam sufficient signal should be transmitted to slow it down in time $\Delta t \leqq l C_{max}$ where $l$ is the length of a cell and $C_{max}$ the maximum velocity employed, over uniform intensity regions. If we compare this mathematical formula with the corresponding formula for the standard television $\Delta t = l/C$, where C is the uniform scanning beam velocity, we notice that there is no saving in the bandwidth whatsoever, one system being limited by $C_{max}$, the other by C. If $C_{max}$ was set equal to C then the two systems would require equal frequency bandwidth, but the uniform scanning system would have the advantage of overall greater number of frames per second and therefore less flicker. For the same number of frames per second, $C_{max}$ would have to be greater than C and therefore, the velocity modulated system would actually require greater bandwidth than the uniform rate scanning system. Therefore, instead of saving bandwidth by the introduction of velocity modulation, an actual loss in bandwidth results. For this reason, the system of the British patent has been tried several times, and has been discarded.

The present invention recognizes the problem of the abrupt change following uniformly illuminated regions as well as all other graduations of the same effect, and provides for advanced information of such intensity changes so that the receiver, despite the restriction of the narrower frequency bandwidth signal received, is capable of processing such intensity changes. The invention provides for wide bandwidth circuitry in the signal generating section so that sufficient time is allocated to every picture element. Amplitude frequency compensation networks are provided also in the signal generating section to partly compensate for the signal deterioration through the low freqency transmission circuit. Finally, the video amplitude is obtained in the receiver and reproducing section from the received signal after it is delayed by a certain time interval, so that the electronic circuitry which generates the sweep rate can receive and compare the delayed and non-delayed signal and prepare for the sharp variation to come. In this manner, when a sharp variation is to follow some of the advanced signal is allowed to leak through and be combined with the delayed signal so that the scanning rate of the reconstituting beam starts slowing down gradually. In this way, sharp variations requiring wide bandwidth are eliminated.

FIG. 1 shows a graphical presentation of a hypothetical pulse of picture intensity and how the pulse is differently treated by Briza's system and present invention. The configuration *a* in FIG. 1*a* shows picture intensity versus the horizontal picture coordinate. FIG. 1*b* shows signal *c* which may be generated in Briza's system for the formulation of the exploring and reconstituting velocity. No mention is made in Briza's patent that the exploring velocity should be controlled by a current resembling signal *b* and that the reconstituting velocity should be controlled by a current resembling signal *c* of FIG. 1*b*. The lines running between FIGS. 1*a*, 1*b*, and 1*c* indicate the time apportionment of the different parts of the picture. FIGS. 1*b* and 1*c* represent signal value versus time. The vertically running lines clearly indicate that a short time is allocated to the regions with uniform intensity and a longer time to the regions where the intensity varies. Briza's patent does not differentiate between signals *b* and *c* of FIG. 1*b*, and refers to them as if they were identical. In fact, the very important point of the frequency bandwidths of the circuitry in the signal generating section and the transmitting sections is not recognized or mentioned in Briza's patent. Briza shows a resulting signal resembling that of signal *c* in FIG. 1*b*. Briza therefore missed the important point that the signal generating network should have a wide bandwidth, preferably a wider bandwidth than is now allocated to conventional television cameras. This wide bandwidth is necessary to slow down the velocity of the exploring beam before the scanning of the particular variation is completed; otherwise the slowing down of the scanning velocity serves no purpose. If this bandwidth is not sufficiently wide, the discontinuity will be scanned with maximum velocity, and the high frequency pulse necessary for slowing down the exploring beam will not be given time to develop and therefore the fine detail will be lost. On the other hand, if Briza were to use wide band circuitry for the generation of a signal similar to *b* the transmission network being of much narrower bandwidth, would distort the signal to something looking like signal *c*. The area shown in FIG. 1*b* between signals *b* and *c*, corresponding to the integral $$\int\left(\frac{db}{dt}-\frac{dc}{dt}\right)dt$$

results in a delayed reduction of the reconstituting velocity, and therefore an effective forward displacement of the reconstituting beam relative to the overall picture. Such arbitrary displacements amount to a lack of synchronization and scrambling of the picture.

The invention takes account of these important defects and provides for their compensation and correction. First, wide bandwidth circuitry is provided for the generation of the signal so that any variation in the picture intensity is detected within a sufficiently small time interval and while the variation progresses. The resulting signal in the signal generating section is similar to *b* of FIG. 1*b* or 1*c*. It is generally desirable that signal *b* is fed through a simulated low frequency network which converts signal *b* to something looking like signal *c* of FIG. 1*c*. Signal *b* can be compared with signal *c* and amplified proportionally to the difference between signals *b* and *c* before it becomes available for transmission. Thus, during the process of compensation for some of the losses which the signal will encounter through the transmission network signal *d* results. Signal *d* then suffers a predetermined deterioration during transmission and is received by the receiver as signal *e*. Signal *e* before it is used to control the intensity of the picture, is accordingly delayed. An amount of non-delayed signal proportional to the difference between the delayed and non-delayed signals is added to the delayed signal before the latter is employed for the reproduction of the sweep velocity. The combination of these two signals results in a new signal shown in FIG. 1*c* as signal *f*. It may be seen from FIG. 1*c* that the graphs of signals *f* and *b* cross in such a way that the integral of the difference $$\int\left(\frac{df}{dt}=\frac{db}{dt}\right)dt$$

is approximately zero, or generally such that the total displacement of both the exploring and reconstituting beams is the same. The instantaneous deviation between signals *f* and *b* correspond to such a small effective displacement on the actual picture as to be of no consequence. This is true because the electronic beam is travelling in this instance at a very slow velocity.

An embodiment of the invention which provides a variable scanning rate closely controlled by the picture video signal will now be fully described. The scanning rate at any instant closely approaches the inverse value of the rate of change of picture intensity. The rate of change of picture intensity is defined as the variation of the light intensity of the picture per unit horizontal length of the picture.

Figure 2:
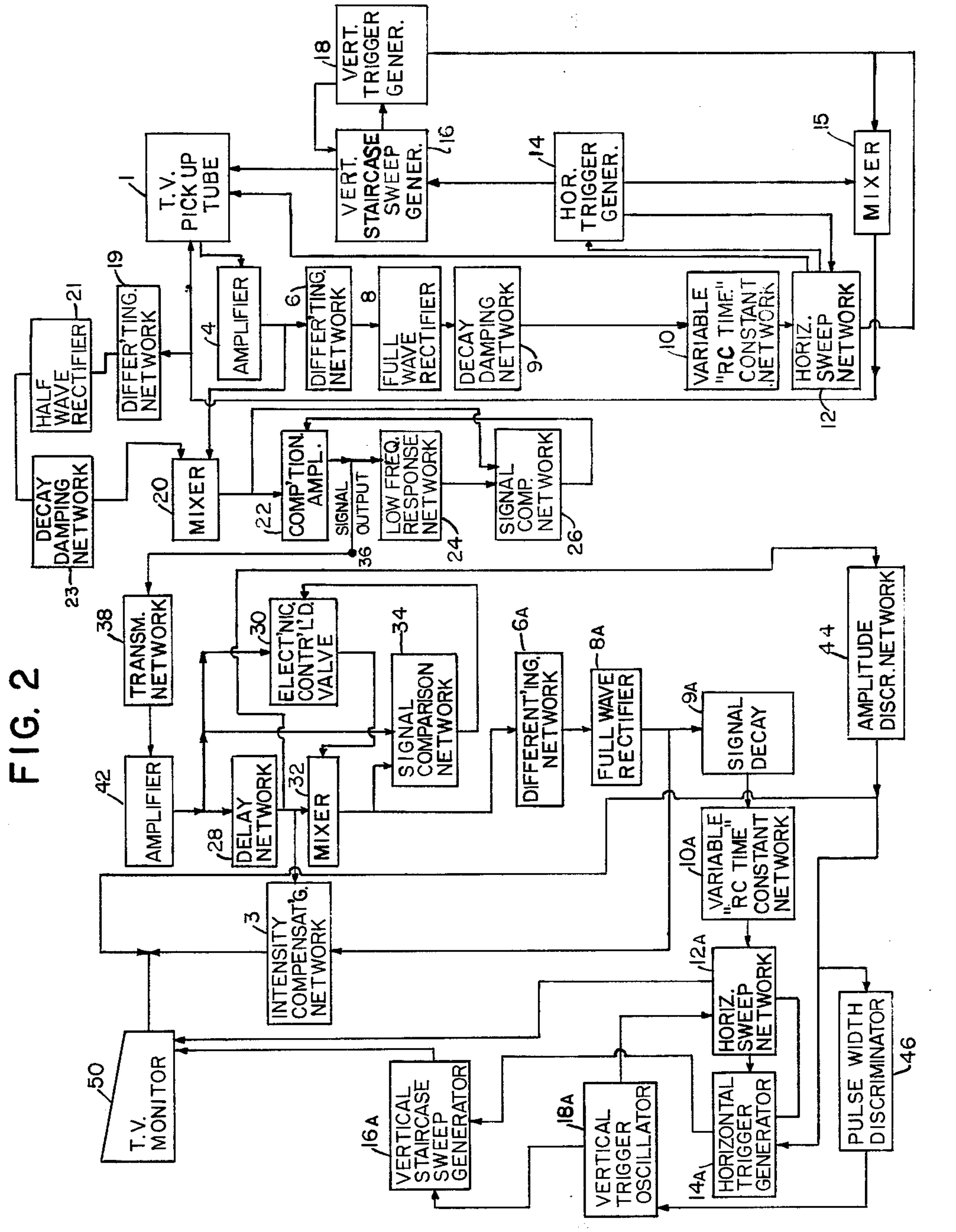
FIG. 2 is a block diagram of one embodiment of the invention.

Referring now particularly to FIG. 2, a pick up or camera tube 1 serves to receive the picture to be processed and to produce a signal which can be used to reproduce the picture by electronic means. At present, a Vidicon tube, with an electrostatically deflected beam is used. Vidicon tube 1 consists of a cathode which produces electrons, an accelerating field which imparts velocity to the electrons, focusing fields which constrain the electrons to a narrow pencil beam, a grid which controls the amount of electrons in the beam, a sensitive surface usually referred to as the mosaic on which the picture to be read is focused, while the electronic beam scans the mosaic. An output lead is connected to the mosaic to carry electrons at any instant equal to the number of electrons which have been lost by the particular element of the mosaic being scanned at that instant, because of the light incident on that element during the previous picture frame-time interval. The electron beam is scanned in both horizontal and vertical senses and the amount of deflection of the beam at any instant depends on the value of the horizontal and vertical deflection voltages fed into the deflection elements at that instant. The signal obtained from the signal output lead connected to the mosaic is electrically connected to an Amplifier 4. The output of Amplifier 4 is divided into two paths. One path feeds differentiating network 6, which gives a signal approximately equal to the derivative of the signal fed into it, and the other path feeds Mixer 20. The output from network 6 goes through a Full Wave Rectifier 8, which effectively inverts the positive part of the signal to produce a negative signal. This network, therefore, changes the bipolar derivative into a unipolar signal. It was found useful for extremely narrow bandwidths to have the output from Full Wave Rectifier 8 feed into the Decay Damping Network 9. Network 9 provides a high frequency response when the output from Rectifier 8 is increasing, but provides a slow response during the decay of such signal, and therefore serves to damp the decay of the signal and slow down the sweep even further. This is easily accomplished by the addition of a diode and a resistor in parallel in the current carrying path of the differentiating network. The output from network 9 feeds into an electronic network 10 which provides a variable "RC time constant" by controlling the charging rate of a capacitor which is part of network 12. At the present, network 10 consists of an electronic valve, the conductivity of which and, therefore, the plate current, is varied by the signal applied to its grid. Network 12 is a horizontal sweep voltage generator of the type used in oscilloscopes and television circuits to produce horizontal scanning of an electron beam. It consists essentially of a capacitor which is charged by a constant voltage supply through a resistance. Since network 10 provides an electronically variable resistance, while the voltage supply remains relatively constant, the charging rate of the capacitor can be varied at will. Network 14 is a Horizontal Trigger Generator and serves to generate a trigger pulse when the charging capacitor reaches a certain potential. This pulse is fed back into network 12 and serves to stop the charging of the capacitor and discharge the capacitor so that a new charging cycle can begin. Network 12 is actually a monostable multi-vibrator. Vertical Staircase Sweep Generator 16 contains a capacitor which is charged to different voltage values in a stepladder fashion so that each step of the capacitor potential corresponds to a different vertical deflection of horizontal lines. Network 16 utilizes the trigger pulses from network 14 to charge its charging capacitor. When a certain capacitor potential has been reached, Vertical Trigger Generator 18 is activated to produce a trigger pulse which is fed back into network 16 to stop the further charging of the capacitor and to discharge the charged capacitor so that a new field cycle may be initiated. The pulse from network 18 is also fed into the Horizontal Sweep Generator 12 so that during the duration of this pulse, the Horizontal Sweep Generator 12 remains inactive. Trigger pulses from networks 14 and 18 are combined through mixer network 15 and fed to the grid of the Vidicon as blanking pulses during retrace. The leading edges of the blanking pulses from networks 14 and 18 are obtained by means of networks 19 and 21. The width of the pulses is slightly broadened by network 23, and then the pulses are fed into Mixer 20, which is a conventional mixing network employed to combine these pulses with the signal from Amplifier 4 in the process of the generation of the composite video signal. Instead of the decay damping network 23, a pulse generating network may be employed to transform the leading edges of the pulses into pulses of predetermined width. Mixer 20 feeds into a Compensating Variable Gain Amplifier 22, having a gain determined by the output of Signal Comparison Network 26. Network 22 feeds into a low frequency response network 24, which simulates the response of the particular low frequency Transmission Network 38. The output from network 24 and the video signal from Amplifier 4 are fed to Comparison Network 26 which gives an output proportional to the difference of said signals. This difference is fed as a positive feedback to the Compensation Amplifier 22. The output from network 22 is connected to Output Terminal 36 to serve as the signal to be transmitted.

The signal generating part of the circuit described above operates as follows: As the signal from the pick up camera tube 1 varies, its derivative is generated by network 6. The derivative is changed into a unipolar signal by network 8 and is fed as a negative feedback on to the grid of the variable RC time constant network 10 through the decay damping network 9. The purpose of network 9 is to smooth out the recovery of the sweep speed to give time to the receiver to catch up in scanning. before a new variation starts. The sharper the variation, the larger the negative voltage fed into network 10 and, therefore, the higher the effective resistance and the "RC" time constant of network 10 becomes. This resistance is the resistance presented in the charging of the capacitor of network 12 and therefore the larger the derivative of the signal the slower the charging of this capacitor. Slow charging of this capacitor causes slowing down of the horizontal deflection rate of the reading beam in the camera tube. Networks 22 through 34 are for partial compensation for the inefficiency of a low frequency response transmission network to pass fast changes in the scanning rate signal. The loop comprising networks 22, 24, and 26 serves to increase the intensity of the video signal as it appears after the low frequency response network 24 so that this signal approximates the amplitude of the signal feeding into network 6 after it is passed through the low frequency response network 24.

The output 36 is connected to the Transmission network 38. Network 38 may be a simple transmission line suhc as a two wire line or a coaxial transmission cable, or it may constitute space transmission means, as is presently used for conventional home TV, or it may consist of recording means which record the information on magnetic tape or other memory devices, then repeat the information which feeds into Amplifier 42.

The left side of FIG. 2 is a block diagram of the circuitry of the receiving and picture reproducing section of the equipment. Circuits which are analogous to circuits in the transmitter are given the same reference number followed by "A." The output from Amplifier 42 is divided into two paths; one path includes network 28 which delays the signal a predetermined amount, while the other path carries non-delayed signal. The delayed signal is split into two paths. One path feeds into a mixer 32 which also receives non-delayed signal from Amplifier 42 through an Electronic Controlled Valve 30. The amount of signal passing through Valve 30 is determined by the difference between delayed and non-delayed signals. The mixture of delayed and non-delayed signals is compared by the Signal Comparison Network 34 with the non-delayed signal. A conventional difference amplifier is presently employed at network 34. The output from network 34 is proportional to the difference between the delayed and non-delayed signals and serves as a volume controlling signal for Valve 30. Thus, Valve 30 supplies only the required amount of advanced information as to a sharp variation of signal so that the scanning beam of the reproducing monitor tube starts slowing down ahead of time, and only to the required extent, so that the change in scanning rate because of a picture intensity variation can be processed by the video signal arriving through Network 38, which is assumed to have a narrower bandwidth than the circuitry employed in the video generating section. The compensated output from the Mixer 32 feeds into a differentiating Network 6A, which feeds the differential of the signal to a full wave rectifier 8A. The unipolar output of full wave rectifier 8A feeds into the signal decay damping network 9A which adjusts the total decay damping to equal the decay damping provided by circuit 9. The low frequency response of the transmission network 38 provides most of the decay damping. The output of network 9A feeds the electronically controlled "RC time constant" network 10A, which in turn feeds horizontal sweep generator 12A.

The signal output of Amplifier 42 feeds an Amplitude Discriminator Network 44, which is biased to pass only amplitudes greater than the picture video signal amplitude and, therefore, only allows synchronization pulses to be transmitted to networks 14A, 18A, and 46. These pulses are the pulses generated by networks 14 and 18, modified by networks 19, 21, and 23, and mixed with the picture video signal by mixer 20 in the signal generating section of FIG. 2. While all synchronization pulses reach network 14A, only the field synchronization pulses reach network 18A as Discriminator 46 filters and allows to pass only those pulses which exceed a predetermined pulse width and amplitude. Network 46, therefore, allows the synchronization pulses which are transmitted at the end of each field to activate the network 16A through network 18A. Another path from the output of network 44 leads to the grid of the monitor tube 50 to blank the electron beam during retrace of either horizontal lines or fields.

The signal pertaining to the picture intensity is obtained from the output of the Delay Network 28 and is fed through amplifier 3 to the grid of the monitor tube 50. The principal purpose of amplifier 3 is to equalize the signal with respect to the variable scanning rate of the reproducing beam. It was found that when uniform regions of the picture are scanned, a lower than actual intensity is reproduced because the electron beam is travelling at a relatively high rate, and therefore the electrons per unit length of the picture line is lowered. Conversely because of the low velocity of the scanning electron beam, a greater number of electrons per unit length of the screen fall on the screen than would have in the case of uniform rate of scanning. This effect was not found to be present in camera tube 1 because the reading beam only reads the cumulative number of electrons lost during the previous field time interval and therefore the camera signal is not affected by the rate of scanning in this sense. Amplifier 3 effectively amplifies the signal in a manner inversely proportional to the variation of picture intensity by employing the signal received from network 8A as a negative feedback.

Figure 3:
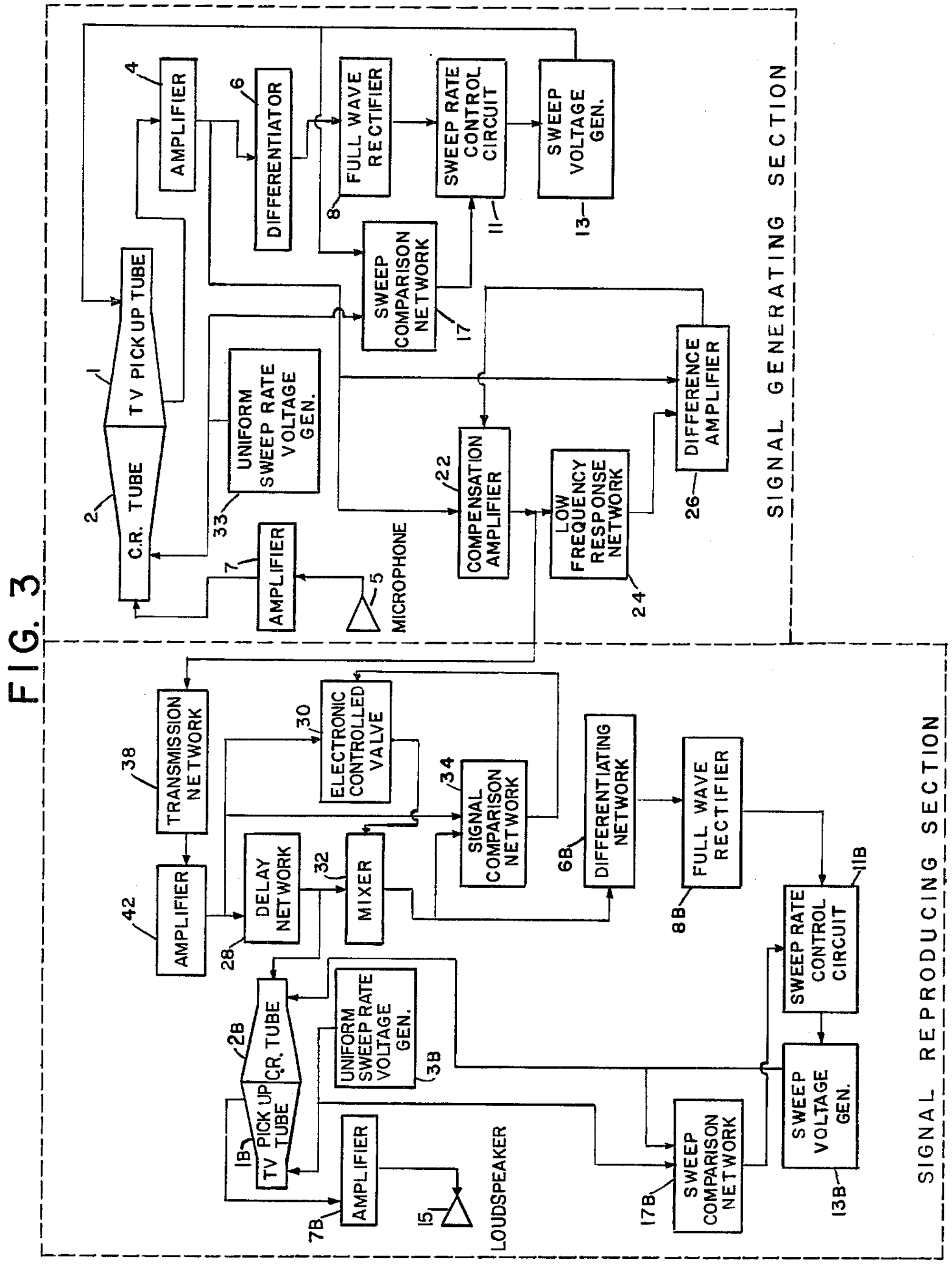
FIG. 3 is a block diagram of another embodiment of the invention.

The embodiment of the present invention shown in FIG. 3, henceforth referred to as Embodiment B, applies the principles of the invention to a non-visual display system or a visual display system in which the reading beam of the television camera employs a conventional method of scanning. For example, the invention may be employed to compress the bandwidth of an audio signal.

In Embodiment B the signal is first converted to a stored pattern. Subsequently, this pattern is scanned and processed in the manner provided by the present invention. Although Embodiment B relates to a speech compression device the same technique may be employed for the bandwidth compression of other signals. It thus may be specifically employed to convert a video signal generated by conventional means into a signal which can be stored, transmitted, and generally processed by equipment operating in accordance with the invention. In this case the received signal is first processed by storing it in a cathode ray storage tube at uniform scanning rates, and then read and further processed at variable scanning rates in accordance with Embodiment B. The advantages of speech compression devices are first that each speech conversation can be processed by a narrow bandwidth channel, and second that the speech once coded in accordance with present invention is unrecognizable but can be reinstated into its original form by means of the present invention.

As the beam current is modulated by the sound intelligence, the luminous intensity of the electron trace on a C.R. tube screen is accordingly modulated. Next, the luminous trace is transferred to the face of a television pick up tube, such as a vidicon. This transfer may be accomplished by means of lens focusing or by placing the face of the oscilloscope in direct proximity with the face of the vidicon. The vidicon provides its own electron beam which is deflected to follow the same path as the luminous trace produced by the C.R. Tube, however while in the case of C.R. tube the trace is inscribed at a uniform displacement rate, the rate of scanning of the trace by the vidicon beam is not constant, but is closely controlled by the signal itself. Specifically, the rate of scanning of the vidicon tube is made to be approximately inversely proportional to the highest frequency present in the resulting signal as the luminous trace is scanned. In this manner when the signal varies rapidly, high frequencies are generated which cause the vidicon beam to move slowly, and vice-versa. The vidicon beam sweeps at the same rate as the C.R. tube beam if it catches up with the C.R.T. beam, and as long as the frequencies involved are lower than the available bandwidth; otherwise, it falls behind the C.R. tube beam. The resulting signal output of the vidicon contains information of both amplitude and synchronization.

In effect, the invention provides for stretching the high frequency signals in time to reduce them to a lower frequency, while squeezing the lower frequency signals in time to gain some of the time lost in the processing of frequencies higher than the allowable bandwidth. The present efficiency of speech processing devices is very poor considering the frequency distribution of the human speech plus the hesitations and silence periods, which are not utilized. Present methods designed to utilize silence and hesitation periods often result in breaking of the speech continuity.

The narrow frequency bandwidth signal resulting from the present invention is unrecognizable and may be transmitted to the receiver by conventional means. In the receiver, the inverse process occurs. The intelligence is first processed by a C.R. tube of variable sweep rate, controlled by the signal itself. The resulting trace is transferred to the face of a pick up tube such as a vidicon, the electronic beam of which sweeps at a constant rate equal to the rate of the original CRT, so that the intelligence is transformed back to its original waveform.

In FIG. 3, Microphone 5 is connected by Amplifier 7 to C.R. tube 2 so as to modulate the current of its electron beam, and hence the light intensity of the trace. Uniform Sweep Voltage Generator 33 feeds to the deflection elements of C.R. tube 2 the deflection voltages necessary to produce the desired circular, TV raster or other scanning pattern on the screen of Tube 2. Tube 2 is followed by a pick up tube 1, such as a vidicon tube. In FIG. 3, tubes 2 and 1 are shown placed back to back in direct proximity; but a focusing lens system may be employed to transfer the luminous trace from the face of Tube 2 to the sensitive surface of Tube 1. It may be noted that instead of C.R. Tube 2 and pick up Tube 1, a scanning converter storage tube commercially available may be employed. The intensity modulated luminous trace now on the sensitive surface of Tube 1 is scanned by the electron beam of Tube 1 by means of deflection voltages fed to this tube from Sweep Voltage Generator 13. Sweep Voltage Generator 13 generates voltages capable of scanning the same configuration as that of the luminous trace, but at speeds closely controlled by the rate of variation of the intensity of the trace itself, and therefore the high frequency content of the resulting signal. To achieve this, the output signal from Tube 1, after it is properly amplified by Amplifier 4, splits in two paths. One path feeds the circuitry which properly compensates the signal to be transmitted, and the other path feeds circuitry which processes this signal as in FIG. 2 to determine the rate of scanning of the luminous trace. Thus, the signal is first differentiated by Differentiator 6. Full Wave Rectifier 8 converts the bipolar nature of the signal derivative from Network 6 to a unipolar signal which feeds Sweep Rate Control Circuit 11. This circuit is biased by the unipolar derivative from Network 8 to control the sweep rate of Sweep Voltage Generator 13. Full bandwidth is given to circuits 4, 6, 8, 11 and 13. This section, therefore, serves to allocate minimum time to the particular length of luminous trace scanned, and feeds proper deflection voltages to cause pick up Tube 1 to scan at exactly this rate. The rate of scanning is determined by the highest frequency present of the resulting signal itself. The other path of the signal from Amplifier 4 may go through a compensating network similar to that employed in FIG. 2 before it is transmitted. This compensation network which is not mandatory, consists of circuits 22, 24, and 26, and serves to modify the signal to partially compensate for its deterioration through the transmission network 38. The bandwidth of the output signal has already been reduced to a narrower bandwidth by means of proper time allocation to high frequencies. When the sweep of Tube 1 catches up with the sweep of Tube 2, Sweep Comparison Network 17 is activated and takes control of the sweep of Tube 1 by feeding retarding voltages to Network 11.

The signal is fed through the Transmission Network 38 to the receiver which is shown on the left side of FIG. 1. The signal is first amplified by Amplifier 42 and then divided into two paths. One path feeds delay network 28 which supplies delayed signal voltage to the intensity controlling element of C.R. Tube 2B. An intensity compensation network such as amplifier 3 of FIG. 2 may be inserted between Delay Network 28 and the intensity controlling element of C. R. Tube 2B, to adjust the intensity signal in the overall sense and compensate for the effect of changing the number of electrons per unit length of the trace per unit time as the sweep rate is changing. This compensation improves fidelity in the television counterpart of the system and it is accomplished by feeding the output of Full Wave Rectifier 8B as a negative feedback to this amplifier. The sweep rate of C. R. tube 2B is determined by networks 32, 30, 34, 6B, 8B, 11B, 13B, and 17B in a manner similar to that of FIG. 2. Thus some of the delayed signal from network 28 is compared with the non-delayed signal by means of the signal comparison network 34. A voltage from network 34 proportional to the difference between its two input signals is fed to control the Electronic Controlled Valve 30, which serves as a variable gate to determine the amount of the non-delayed signal to be combined in mixer 32. The signal from mixer 32 is processed then in the same manner as in the Signal Generating Section of FIG. 2.

The networks designated by numbers followed by the letter B indicate networks similar to those designated by the same number in the Signal Generating Section, and perform similar functions. The balance of the circuitry in the receiver is essentially the same as the circuits of FIG. 2 and therefore require no additional description.

Figure 4A:
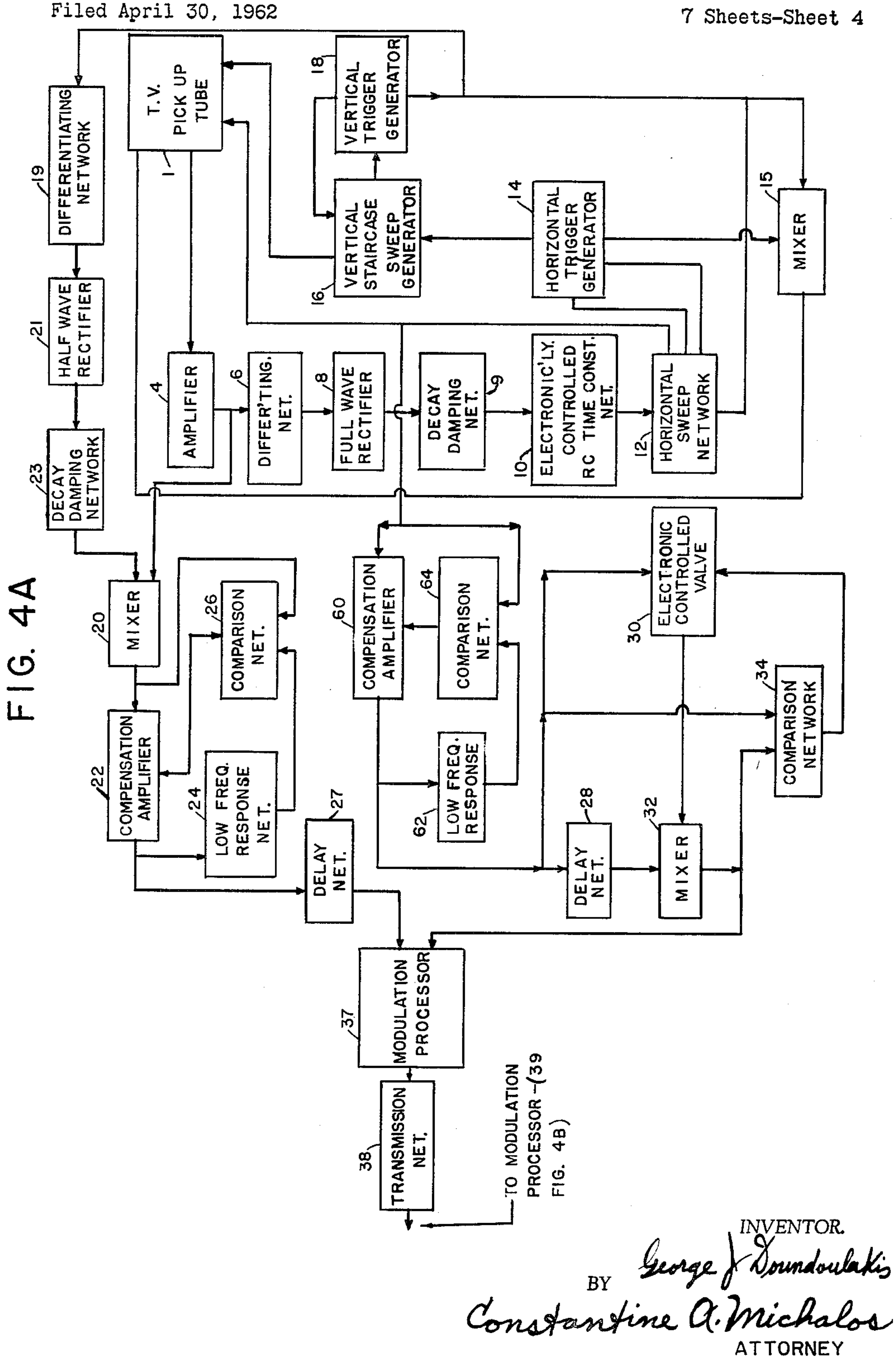
FIG. 4A is a block diagram of the signal generating section of a third embodiment of the invention.
Figure 4B:
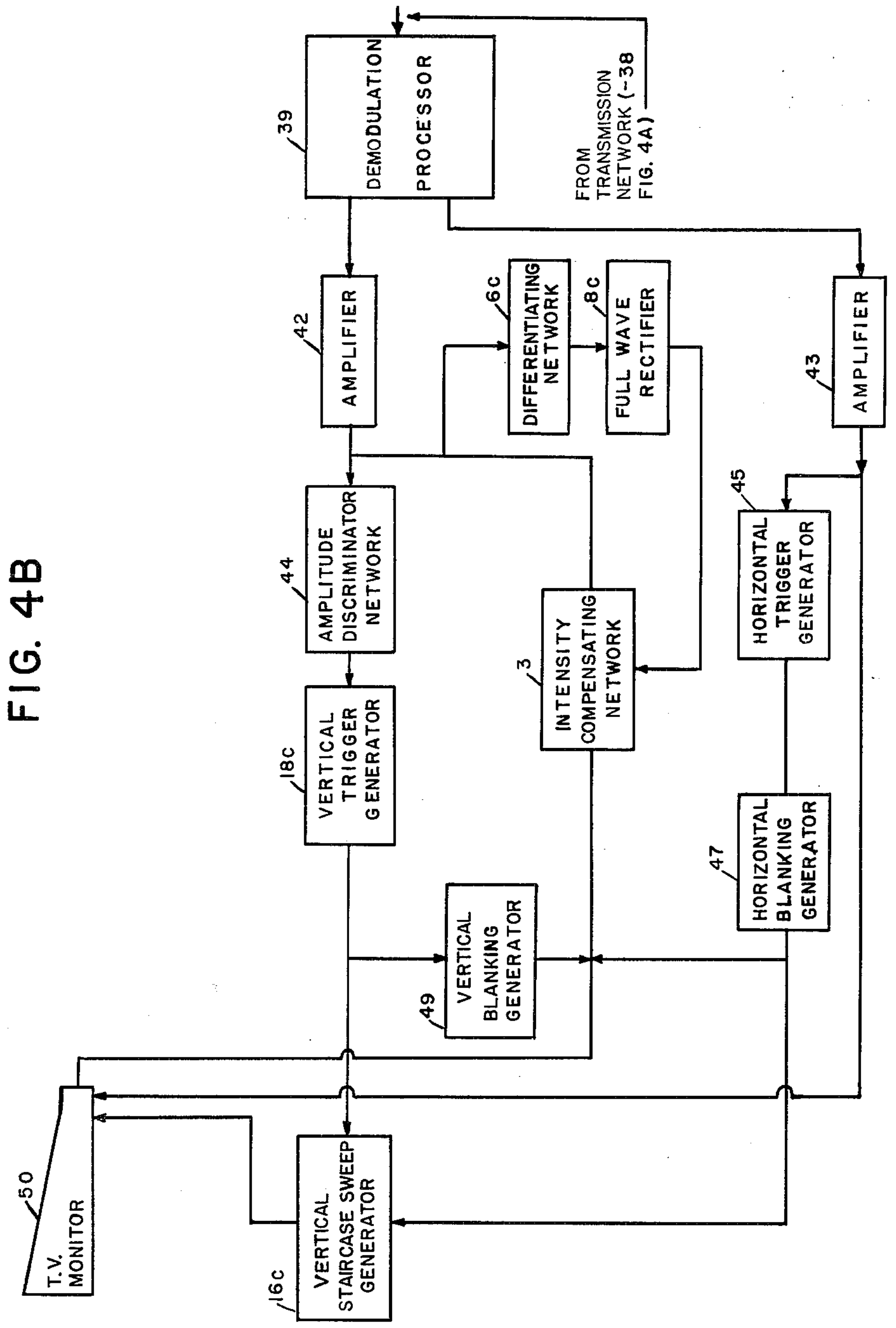
FIG. 4B is a block diagram of the signal reproducing section in accordance with the embodiment shown in FIG. 4A.

In the embodiment of FIGS. 4A and 4B, which will be designated Embodiment C, the synchronization and the picture-video signals are processed independently in both the transmitters and receiver. In FIGS. 2 and 3, both signals are contained in the video signal, which after being compensated with respect to the high frequencies, is transmitted as a single signal, and is resolved by electronic means into two different signals.

The immediate advantages realized in the embodiment of FIGS. 4A and 4B are, first, the elimination of the horizontal sweep generating circuitry from the receiver side, and the elimination of the need for transmitting horizontal synchronizing pulses due to the fact that the horizontal position of the reproducing electron beam is continuously supplied. Also, the signal delay may be accomplished in the transmitter side and thus the receiver circuitry is simplified.

It may be noted from FIG. 4B that a very simple receiver and picture reproducer is achieved. In several instances it is much easier to employ two channels of partial bandwidth rather than a single channel of full bandwidth. Although two channels instead of one are used there exists a saving in bandwidth because of the elimination of the need to transmit the horizontal synchronizing pulses, which can be generated at the instant the horizontal synchronizing signal reaches a predetermined value. As an example, suppose Transmission Network 38 is a tape recorder of limited bandwidth such as a stereo tape recorder. In the stereo recorder there are two channels readily available for the two signals, while increasing the bandwidth of the recorder, to accommodate combined signals would require major redesign.

Since independent modulation may be employed for the video amplitude signal and the horizontal synchronization signal, several variations may occur in the circuitry of Embodiment C, depending on the combination of modulation techniques employed in the transmission of said signals.

In FIG. 4A, the sweep control and blanking pulse generation is accomplished in the same manner as in FIG. 2 by means of the same circuits, namely 1, 4, 6, 8, 9, 10, 12, 14, 15, 16, 18, 19, 20, 21, 22, 23, 24, and 26. The video signal, however, is delayed by Delay Network 27 in the signal generating section instead of being delayed in the receiving and reproducing section as shown in FIG. 2. Further, the horizontal sweep signal from the horizontal sweep network 12 feeding TV pick up tube 1 is also channeled and processed independently from the video signal. The horizontal sweep signal is amplitude compensated by networks 60, 62, and 64, and delayed by network 28. The delayed and non-delayed signals are mixed in proper proportion by networks 30, 32 and 34. It may be seen by a comparison of FIGS. 2 and 4A that networks 28, 30, 32, and 34 are located in the receiver of FIG. 2, while in FIG. 4A they are located in the signal generation or transmitter section.

Figure 5A:
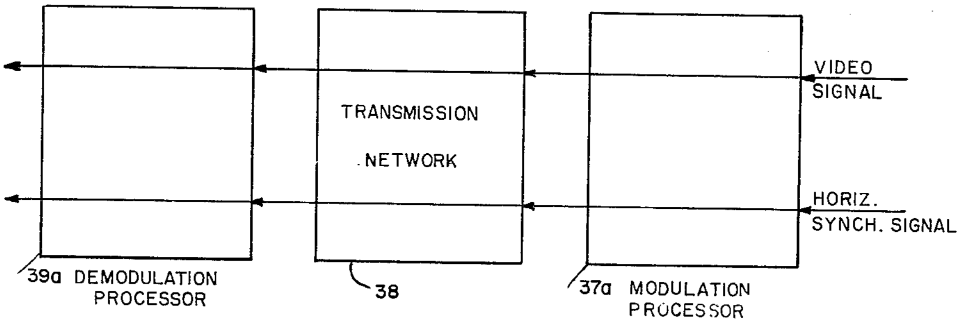
FIGS. 5 to 5D are diagrams of various modulations and transmission networks for the video and synchronizing signals.
Figure 5B:
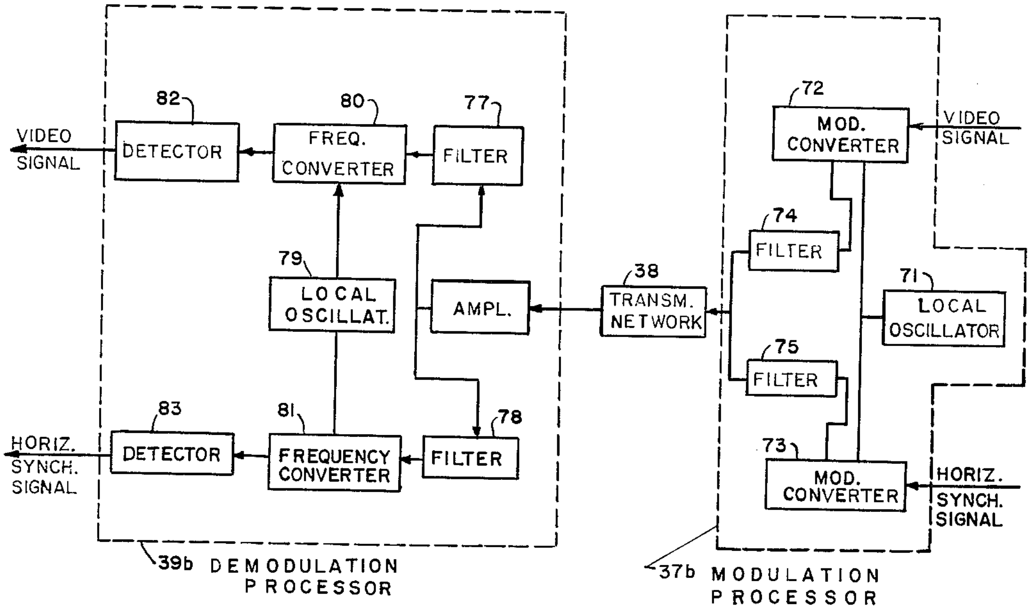

Both the video signal from Delay Network 27 and the horizontal synchronization signal from mixer 32 are fed into the Modulation Processor 37, Transmission Network 38, and Demodulation Circuit 39. As mentioned above, the Modulation and Demodulation circuits may take several forms depending on the type of modulation employed for each of said signals. For example, the signals may not be altered, but fed as they are into a simple dual transmission line as shown in FIG. 5A. Another suitable arrangement is shown in FIG. 5B where both signals are AM modulated on the same carrier by circuits 71–73. The signals are then multiplexed by filters 74 and 75, which select only the upper sidebands of one signal and the lower sidebands of the other for transmission. After reception, the two signals are separated by filters 77 and 78, converted by means of oscillator 79 and separate converters 80 and 81, and separately detected by detectors 82 and 83.

Figure 5C:
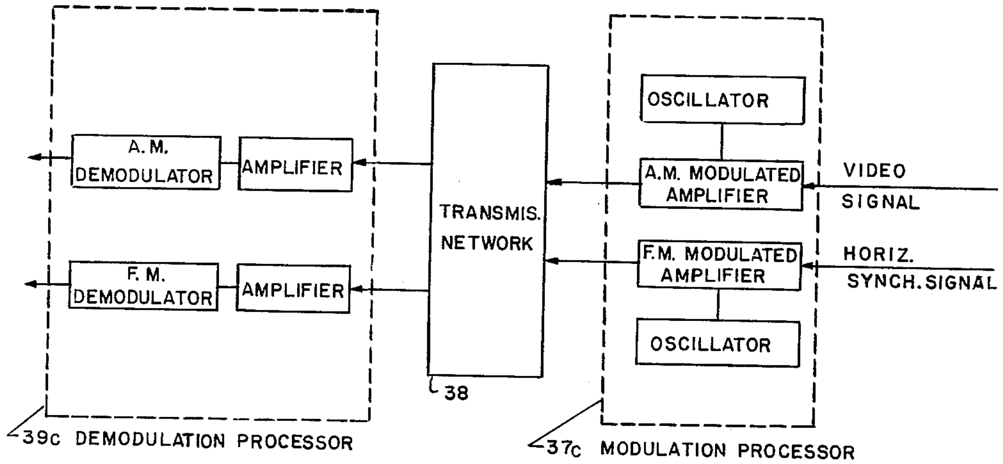
Figure 5D:
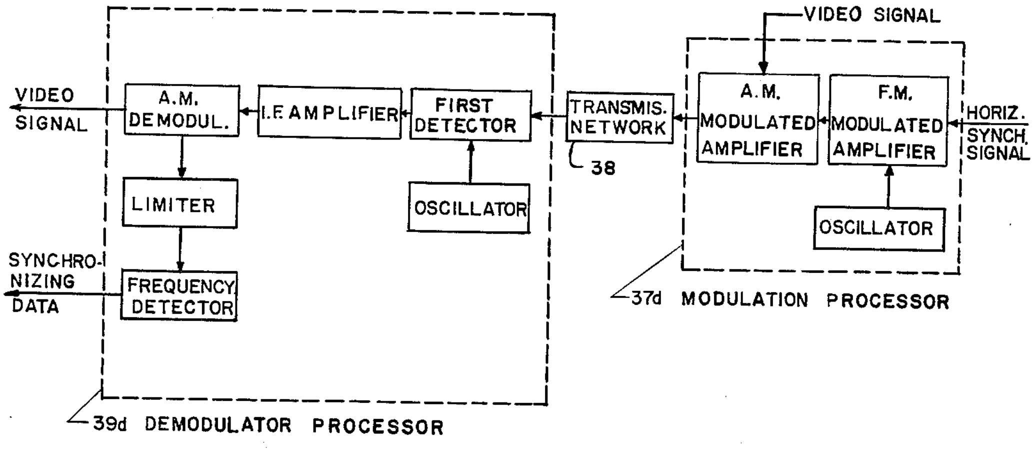

FIG. 5C shows still another modulation technique where the video signal is AM modulated, whereas the horizontal deflection signal is FM or phase modulated in modulator **37*c*. Another method of multiplex transmission is shown in FIG. 5D where the horizontal deflection signal modulates a carrier. The resulting signal is then used as a carrier for the video signal which is AM modulated on the FM carrier by modulator 37*d*. After the signal is received the AM modulation is first extracted while the remaining signal is demodulated for the extraction of the FM modulated horizontal deflection signal by circuits 39*d*.** This scheme may be employed in the present system because the two signals are correlated. Thus, for example, when the amplitude varies very fast the horizontal deflection signal remains practically constant, in which case the resulting wave is effectively an AM wave. On the other hand when the video signal remains constant the horizontal deflection signal varies fast, so the resulting wave may be regarded an FM wave.

The two signals from the Demodulation Processor 39 follow the paths shown in FIG. 4B. The video amplitude signal is amplified by Amplifier 42 and is fed to the grid of the TV monitor tube 50, through the intensity Compensation Network 3, the function of which has been described in FIGS. 2 and 3. The video signal also carries the vertical synchronization pulses which are filtered through by the Amplitude Discrimination Network 44 and fed to the Vertical Trigger Generator 18C, which excites both the Vertical Staircase Sweep Generator 16C and the Vertical Blanking Generator 49, which generates the blanking pulse between frames.

The horizontal sweep signal after it is amplified by Amplifier 43 feeds directly to TV Monitor or C.R.T. reproducer 50 as horizontal sweep signal. The output of Amplifier 43 also excites the Horizontal Trigger Generator 45, which triggers the Horizontal Blanking Generator 47 for the generation of the horizontal blanking pulse. This pulse serves as a blanking pulse and as a pulse charging the Vertical Staircase Sweep Generator 16C. Both the horizontal blanking pulses and vertical blanking pulses feed into the reproducing tube or TV monitor 50 to stop electrons during re-trace.

As will be evident from the foregoing, the invention is not limited to the specific arrangements and details shown and described herein for illustration but that the underlying principle and novel concept of the invention are susceptible of numerous embodiments and modifications coming within its broad scope and spirit as defined in the appended claims. The specification and drawings are accordingly to be regarded in an illustrative rather than a limiting sense.

I claim:

1. A signal transmission system comprising a television camera, means for deriving picture video signals from said camera, deflection voltage generating means for controlling the scanning speed of said camera in an inverse relationship to the variation of the light intensity of the portion of the picture being scanned, transmission means for transmitting said video signals and synchronization signals, means for delaying the received video signals, reproducing means, means for supplying the video signals and the delayed video signals to the reproducing means, said reproducing means including scanning means and means for controlling the scanning speed thereof in response to the difference between the video signals and the delayed video signals.

2. A system according to claim 1, wherein the means for controlling the scanning speed of the camera includes means connected thereto for differentiating the video signals, a full wave rectifier connected to the differentiating means, a damping network connected to said rectifier having a slower response to a decreasing voltage than to an increasing voltage, and a horizontal sweep voltage generating circuit connected to said damping network.

3. A system according to claim 2 wherein said means for controlling the scanning speed of the camera has a wider frequency band than said transmission means.

4. A system according to claim 1, wherein said means for controlling the scanning speed of the camera has a sufficiently wide frequency band to transmit the highest frequency components produced by changes in the scanning speed, said frequency band being wider than the frequency band of said transmission means.

5. A system according to claim 4, including means connected to the input end of said transmission means for amplifying high frequency signal components relative to low frequency signal components for compensating for the greater attenuation of the high frequency components by the transmission means.

6. The system according to claim 1, wherein said last means includes means for combining the delayed and non-delayed signals, means for differentiating the combined delay and non-delayed signals, and means for varying the scanning speed of the reproducing means in response to said differentiating means.

7. The system according to claim 6, including a full wave rectifier connected to the output of said differentiating means, a damping network connected to said rectifier having a slower response to a voltage which is decreasing than to a voltage which is increasing, the output of said damping network being connected to said means for varying the scanning speed of the reproducing means.

8. The system according to claim 7, wherein said means for supplying the delayed video signals to the reproducing means includes means for varying the amplitude of said delayed video signals inversely in accordance with the output of said full wave rectifier.

9. The system according to claim 1, wherein the transmission means includes two independent channels for transmitting the synchronization signals and video signals, respectively.

10. The system according to claim 9, wherein the video signal channel includes amplitude modulation means and the synchronization signal channel includes frequency modulation means.

11. The system according to claim 1, wherein the transmission means includes means for frequency modulating a carrier wave with said synchronization signals and means for amplitude modulating the frequency modulated carrier wave with said video signals.

12. A narrow bandwidth transmission system comprising means for scanning an image and generating video signals, means connected to the image scanning means for producing deflection voltages which vary with the rate of change of light intensity of the image, means for impressing the deflection voltages on the image scanning means for controlling its speed of scanning, image reproducing means, means for delaying the video signals, means for impressing the delayed video signals on the reproducing means, means for deriving sweep voltage signals from said video signals, means for comparing delayed video signals with the video signals, and means for varying the scanning speed of the reproducing means in response to said comparing means.

13. A narrow bandwidth transmission system comprising means for storing message signals at a uniform recording rate, means for scanning the stored signals and producing electrical signals therefrom, means for detecting the rate of change of intensity of the stored signals, means for varying the speed of said scanning in accordance with said rate change of intensity, means for receiving said electrical signals, said receiving means including means for delaying received signals, reproducing means, said reproducing means including scanning means, means for comparing delayed and received signals, and means for varying the scanning speed of said reproducing means in response to said comparing means.

14. The system according to claim 13, wherein the storing means is a memory portion of a computer signal storing means and said reproducing means is a computer memory portion signal reproducing means.

15. The system according to claim 13, wherein the storing means is a dual beam storage tube frequency storing means and said reproducing means is a dual beam storage tube.

16. A narrow bandwidth transmission system comprising means for scanning an image and generating video signals, means for processing the video signals for generating a horizontal sweep voltage, which varies in relation to the rate of change of the light intensity of the portion of the image being scanned, means of generating a vertical sweep voltage from the horizontal sweep voltage generating means, means for impressing the horizontal and vertical sweep voltages on the image scanning means for controlling its speed of scanning, means for generating vertical sweep trigger pulses, means of combining the vertical sweep trigger pulses with the video signals, means for filtering the combination of video signals with the vertical sweep trigger pulses to generate lower frequency signals, means for comparing the lower frequency signals with the combination of the video signals and the vertical sweep trigger pulses, means for amplitude compensating the video signals for high frequency components attenuated during filtering, means for delaying the compensated video signals, means for filtering the horizontal sweep voltage signals to produce lower frequency horizontal sweep voltage signals, means for comparing the lower frequency horizontal sweep voltage signals with the horizontal sweep voltage signals, means for amplitude compensating the horizontal sweep voltage signals for the high frequencies, being attenuated during sweep voltage filtering, means for delaying the compensated horizontal sweep voltage signals, means for comparing the delayed horizontal sweep voltage signals with the compensated horizontal sweep voltage signals, means for altering the delayed horizontal sweep voltage in relation to the compensated horizontal sweep voltage signals, for insertion of advanced information into the horizontal sweep voltage signals and generation of an adjusted horizontal sweep voltage signal, means of transmitting the compensated combination of video signals with the vertical sweep trigger pulses and the adjusted horizontal sweep voltage signals, receiving means for receiving and processing the transmitted compensated combination of the video signals with the vertical sweep trigger pulses and the adjusted horizontal voltage signals, picture reproducing means including an electronic beam, means of channeling the received compensated and delayed video signals to said picture reproducing means, means for horizontally sweeping the electronic beam of said picture reproducing means, means for channeling the received horizontal sweep voltage signals to said horizontally sweeping means, means for vertically sweeping the electronic beam of said picture reproducing means, means for channeling the received vertical sweep trigger pulses to the vertically sweeping means, means for modulating the electron density of said electronic beam, and means of channeling the received video signals to the electron beams modulating means, for picture reproduction.

References Cited by the Examiner

UNITED STATES PATENTS

| | | | |
|---|---|---|---|
| 2,306,435 | 12/42 | Graham | 178—6.8 |
| 2,965,709 | 12/60 | Cherry | 178—6.8 |

DAVID G. REDINBAUGH, *Primary Examiner.*